United States Patent [19]

Syn et al.

[11] Patent Number: 5,429,879
[45] Date of Patent: Jul. 4, 1995

[54] LAMINATED METAL COMPOSITE FORMED FROM LOW FLOW STRESS LAYERS AND HIGH FLOW STRESS LAYERS USING FLOW CONSTRAINING ELEMENTS AND MAKING SAME

[75] Inventors: Chol K. Syn, Moraga; Donald R. Lesuer, Livermore, both of Calif.

[73] Assignee: The United States of America as represented by the United States Department of Energy, Washington, D.C.

[21] Appl. No.: 312,081

[22] Filed: Sep. 26, 1994

Related U.S. Application Data

[63] Continuation-in-part of Ser. No. 77,700, Jun. 18, 1993.

[51] Int. Cl.⁶ .................. B32B 3/18; B32B 15/14; B23K 20/00
[52] U.S. Cl. .................... 428/614; 428/608; 428/635; 428/686; 228/190
[58] Field of Search ............ 428/608, 614, 615, 635, 428/686, 654; 228/190, 235.2

[56] References Cited

U.S. PATENT DOCUMENTS

| | | | |
|---|---|---|---|
| 3,475,811 | 11/1969 | Clarke et al. | 29/472.3 |
| 3,888,661 | 6/1975 | Levitt et al. | 428/608 |
| 4,197,360 | 4/1980 | Throop | 428/651 |
| 4,354,301 | 10/1982 | Takeuchi et al. | 29/160.6 |
| 4,482,912 | 11/1984 | Chiba et al. | 428/608 |
| 5,306,571 | 4/1994 | Dolowy et al. | 428/614 |

FOREIGN PATENT DOCUMENTS 60-148688  8/1985  Japan .................. B23K 20/04

OTHER PUBLICATIONS

Chawla, K. K., et al., "The Stress Strain Behavior of Aluminum/Stainless Steel", *Proceedings of 2nd International Conference on Composite Materials*, TMS-AIME, New York, 1978, pp. 1237–1245. No month.

Kum, D. W., et al., "The Impact Properties of Laminated Composites Containing Ultrahigh Carbon (UHC) Steels", *J. Mech. Phys.*, vol. 31, No. 2, 1983, pp. 173–186, no page 180. No month.

Wright, E. S., et al., "Laminated-Metal Composites" in *Metallic Matrix Composites*, pp. 37–99, edited by K. G. Krieder (New York: Academic Press, 1974). no month.

Bucci, R. J., et al., "ARALL® Laminates", *Treastise on Materials Science and Technology*, vol. 31, 1989, pp. 295–322.

(List continued on next page.)

*Primary Examiner*—John Zimmerman
*Attorney, Agent, or Firm*—Isabelle R. McAndrews; Miguel A. Valdes; William R. Moser

[57] ABSTRACT

A laminated metal composite of low flow stress layers and high flow stress layers is described which is formed using flow constraining elements, preferably in the shape of rings, individually placed around each of the low flow stress layers while pressure is applied to the stack to bond the layers of the composite together, to thereby restrain the flow of the low flow stress layers from the stack during the bonding. The laminated metal composite of the invention is made by the steps of forming a stack of alternate layers of low flow stress layers and high flow stress layers with each layer of low flow stress material surrounded by an individual flow constraining element, such as a ring, and then applying pressure to the top and bottom surfaces of the resulting stack to bond the dissimilar layers together, for example, by compression rolling the stack. In a preferred embodiment, the individual flow constraining elements surrounding the layers of low flow stress material are formed of a material which may either be the same material as the material comprising the high flow stress layers, or have similar flow stress characteristics to the material comprising the high flow stress layers. Additional sacrificial layers may be added to the top and bottom of the stack to avoid damage to the stack during the bonding step; and these additional layers may then be removed after the bonding step.

22 Claims, 3 Drawing Sheets

OTHER PUBLICATIONS

Langan, T. J., et al., "The Effect of TiB$_2$ Reinforcement on the Mechanical Properties of an Al–Cu–Li Alloy-Based Metal–Matrix Composite", *Scripta Metallurgica Materialia*, vol. 25, No. 7, 1991, pp. 1587–1591.

Lee, Stuart, M., Ed., "Metal Matrix Composites, Aluminum", *International Encyclopedia of Composites*, vol. 3, 1990, pp. 187–201.

Manoharan, M., et al., "Crack Initiation and Growth Toughness of an Aluminum Metal–Matrix Composite", *Acta Metallurgica Materials*, vol. 38, No. 3, 1990, pp. 489–496.

Srivatsan, T. S., et al., "The Influence of Volume Fraction of Silicon Carbide Particulate Reinforcement on the Tensile Properties of an Aluminium Metal–Matrix Composite", 1991, pp. 500–502.

Syn, C. K., et al., "Processing and Mechanical Properties of Laminated Metal Composites of Al 6090–25 vol. % SiCp and Al 5182", *International Symposium on Light Materials for Transportation Systems*, Jun. 20–23, 1993, pp. 1–7.

LAMINATED METAL COMPOSITE FORMED FROM LOW FLOW STRESS LAYERS AND HIGH FLOW STRESS LAYERS USING FLOW CONSTRAINING ELEMENTS AND MAKING SAME

ORIGIN OF THE INVENTION

The U.S. Government has rights in this invention pursuant to Contract No. W-7405-ENG-48 between the United States Department of Energy and the University of California for the operation of the Lawrence Livermore National Laboratory.

This is a Continuation-In-Part of application Ser. No. 08/077,700 filed on Jun. 18, 1993.

BACKGROUND OF THE INVENTION

This invention relates to a laminated metal composite, comprising alternating layers of low flow stress material and high flow stress material, and formed using flow constraining elements around each low flow stress layer; and a method of making same.

A composite is a combination of at least two chemically distinct materials with a distinct interface separating the two materials. A metal matrix composite (MMC) is a composite material composed of a metal and a nonmetallic reinforcing agent such as silicon carbide (SIC) or graphite in continuous or discontinuous fiber, whisker, or discrete particulate form. A laminate is a material composed of several bonded layers. It is possible to have a laminate composed of multi-layers of a single type of material bonded to each other. However, such a laminate would not be considered to be a composite. The term "laminated metal composite" (LMC), as used herein, is intended to include a structural material composed of: (1) layers of metal or metal alloys interleaved with (2) a different metal, a metal alloy, or a metal matrix composite (MMC) containing strengthening agents.

It is possible to form a laminate containing two or three different materials with or without a bonding agent. Practical applications are discussed in E. S. Wright et at., "Laminated-Metal Composites", in Metallic Matrix Composites, ed. K. G. Kreider, 1974, Academic Press, New York, at pp 37–99. Examples of laminated materials include multi-layer plywood, multiple ply laminates of boron or carbon fiber-reinforced plastics, and Arall laminates (Aramid fiber reinforced aluminum alloy laminates). Most of the industrial metal laminates, however, contain only two or three layers with thin surface layers cladding a thicker substrate material. Such cladded metal laminates have been used for several decades, due to their cost effectiveness and resistance to wear and corrosion. Kum et at., in J. Mech. Phys. Solids, Vol. 31, 1983, at pp. 173–186, describes metal laminates made of two component metals such as art ultrahigh carbon steel and mild steel. Chowla et at. in Proc. 2nd International Conference on Composite Materials, 1978, discuss, at pp. 1237–1245, the forming of metal laminates composed of aluminum alloy and stainless steel using press or roll bonding techniques. However, metal laminates having five or more component layers are virtually non-existent.

Kum et at., in J. Mech. Phys. Solids, Vol. 31, 1983, at pp. 173–186 have shown that multi-layer laminated metal composites (LMCs) can have damage critical properties superior to those of their component materials. Damage-critical properties essentially represent the resistance to crack initiation and propagation. The resistance to crack propagation is improved in LMCs, because the propagating crack is blunted or eliminated by interlayer delamination. Crack initiation by fatigue and impact can be suppressed by applying a crack-resistant hard layer on the surface.

Laminated metal composites (LMCs) formed from alternate layers of high strength and low strength materials have been found to have excellent damping, fatigue, fracture, wear, and impact properties and could be useful as structural materials for machine tools, buildings, transportation vehicles, and aircraft.

The stress of a component layer impacts the quality of a laminate upon deformation, such as compression rolling. Stress is defined as the load per unit of area. The stress of an individual component layer can be referred to as the flow stress of the layer. In addition, the flow stress may be regarded as the quantity of stress which will cause the material to flow at a given strain and predetermined temperature. A layer with low flow stress flows much more readily than a layer having high flow stress. The flow stress of a material is thus understood to be a relative term. Generally, soft metals have a lower flow stress that hard metals.

Laminates containing two or three layers are made by roll-bonding. Multilayer laminates have been made by stacking alternate layers of component materials and then press-bonding or roll-bonding the resulting stack at an elevated temperature by imposing a large deformation, f the component materials are not too different.

However, laminated metal composites (LMCs) containing component layers having substantially dissimilar flow stresses, i.e., differing by greater than at least 10%, and usually differing by an order of magnitude or more, are difficult to produce by press bonding since those component layers having the lower flow stress will deform prematurely and extrude out of the stack. For example, laminates of a high strength steel and a low strength aluminum alloy are difficult, if not impossible to make by press bonding a simple stack of such differing materials at an elevated temperature near the melting point of the aluminum alloy. In the latter case, the flow stress of the aluminum alloy is far smaller than that of the steel component at the same temperature.

Referring to prior art FIGS. 1 and 2, an initial stack of such dissimilar materials is illustrated at 2 in FIG. 1. Layers 4, 8, and 12 comprise a high flow stress material such as a high strength steel, while intermediate layers 6 and 10 comprise a low flow stress material such as a low strength aluminum alloy. When pressure is applied to this stack, such as by the aforesaid compression roll bonding, much of the low flow stress layers 6 and 10 extrude from the stack, as shown at 16 and 18 in prior art FIG. 2, resulting in the formation of very thin low flow stress layers 6' and 10', as also shown in FIG. 2.

Nakatate, in Japan Patent document 60-148688, addressed this problem of bonding a stack of plate materials having a large difference in deformation resistance by providing frame members around each side of a rectangular stack, then welding the frame members to the stack, and then passing the welded stack through press welding rolls to bond the layers of the stack to one another. While this method apparently provides the desired retention of the low flow stress material in the stack, it requires the provision of weldable materials in the stack to weld the stack to the individual frame members placed on each side of the illustrated rectangular stack.

SUMMARY OF THE INVENTION

The invention comprises a laminated metal composite of low flow stress layers and high flow stress layers formed using individual layers of flow constraining elements, preferably in the shape of rings, individually placed around each of the low flow stress layers while pressure is applied to the stack to bond the layers of the composite together, to thereby restrain the flow of the low flow stress layers from the stack during the bonding. The flow stresses may be different by a large amount, i.e., by an order of magnitude or more.

The laminated metal composite of the invention is made by the steps of forming a stack of alternate layers of low flow stress layers and high flow stress layers with each layer of low flow stress material surrounded by an individual flow constraining element, such as a ring, and then applying pressure to the top and bottom surfaces of the resulting stack to bond the dissimilar layers together, for example, by compression rolling the stack.

In a preferred embodiment, the individual flow constraining elements surrounding the layers of low flow stress material are formed of a material which may either be the same material as the material comprising the high flow stress layers, or have similar flow stress characteristics to the material comprising the high flow stress layers, and preferably the individual flow constraining elements are in the form of rings.

DETAILED DESCRIPTION OF THE INVENTION

The present invention comprises a novel laminated metal composite and a method of making same wherein a stack of materials is first formed comprising alternating layers of high flow stress material and low flow stress material. Each individual layer of low flow stress material is surrounded by an individual flow constraining element to prevent the low flow stress material from extruding from the stack when pressure is subsequently applied to bond the individual layers together to form the laminated metal composite of the invention.

Figure 3:
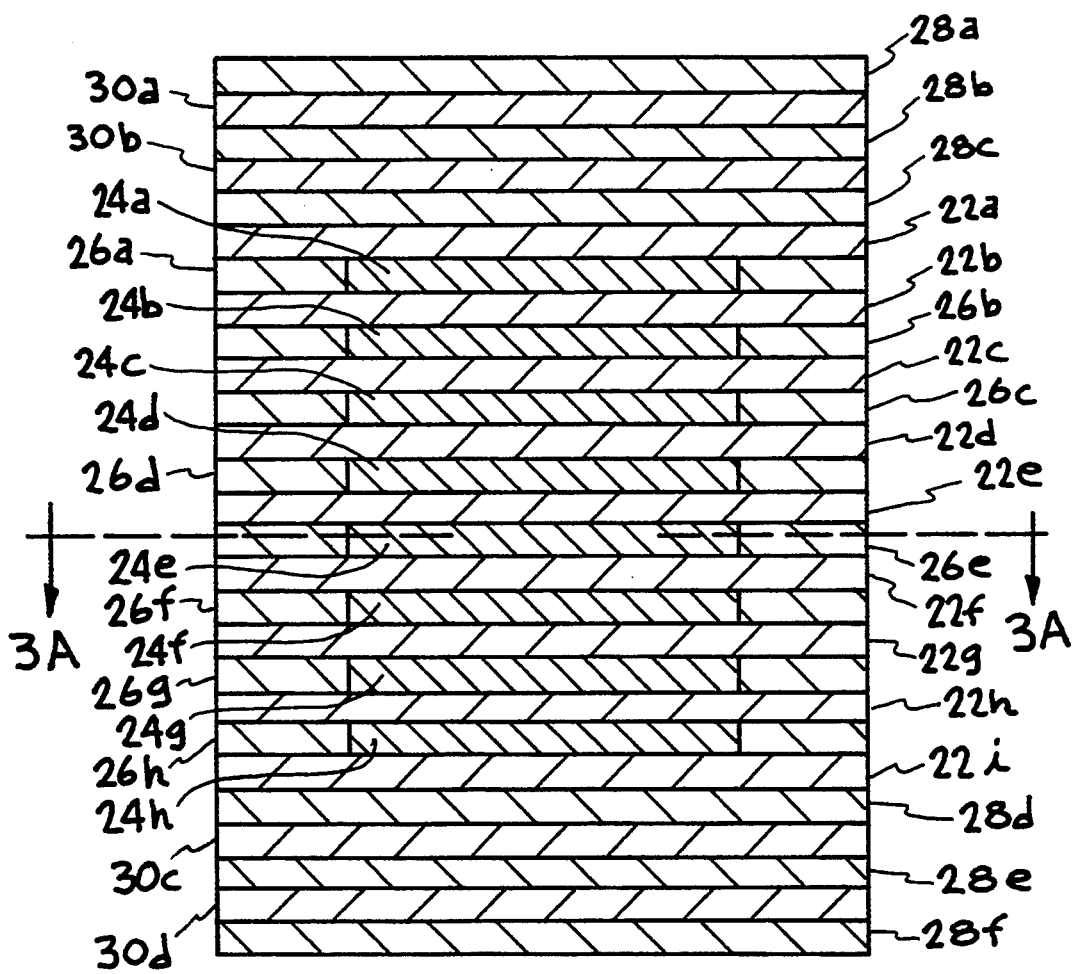
FIG. 3 is a vertical cross-sectional view of a stack of component layers, before compression and bonding, comprising alternate layers of material having substantially different flow stresses with individual flow constraining rings shown formed around each layer of low flow stress material in accordance with the invention.
Figure 3A:
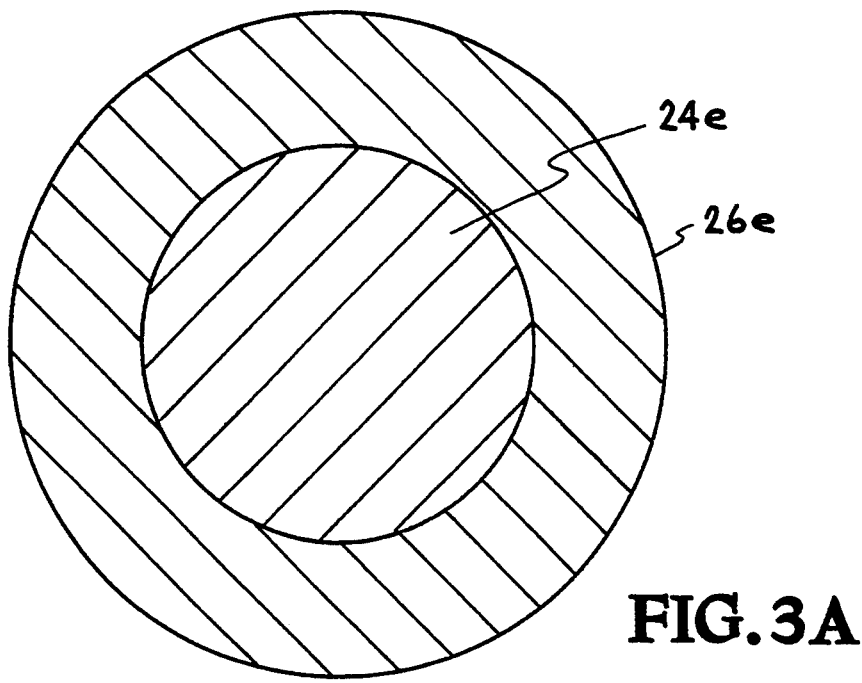
FIG. 3A is a top cross-sectional view of the stack of FIG. 3, taken along lines 3A—3A, showing a circular flow constraining ring formed around an individual low flow stress layer to prevent extrusion of the low flow stress material from the stack during subsequent compression of the stack.

Turning to FIGS. 3 and 3A, a stack of materials, comprising alternating layers of high flow stress material and low flow stress material is generally shown at 20. Layers $22a$–$22i$ comprise layers of high flow stress material. Between layers $22a$–$22i$ are placed layers $24a$–$24h$ of low flow stress material. In accordance with one aspect of the invention, each layer of low flow stress material is individually surrounded by a flow constraining element $26a$–$26h$. In a preferred embodiment each layer of low flow stress material is circular in cross section, i.e., a circular disk, and the surrounding flow constraining material is shaped as a ring, as best seen in FIG. 3A, having an inner diameter approximately equal to the outer diameter of the circular layer of low flow stress material. Thus, as shown in FIG. 3A, circular low flow stress layer $24e$ is surrounded by its own flow constraining ring $26e$. It will, of course, be noted that each of the individual flow constraining layers or rings must have approximately the same thickness as the individual low flow stress layer that it surrounds.

Figure 1:
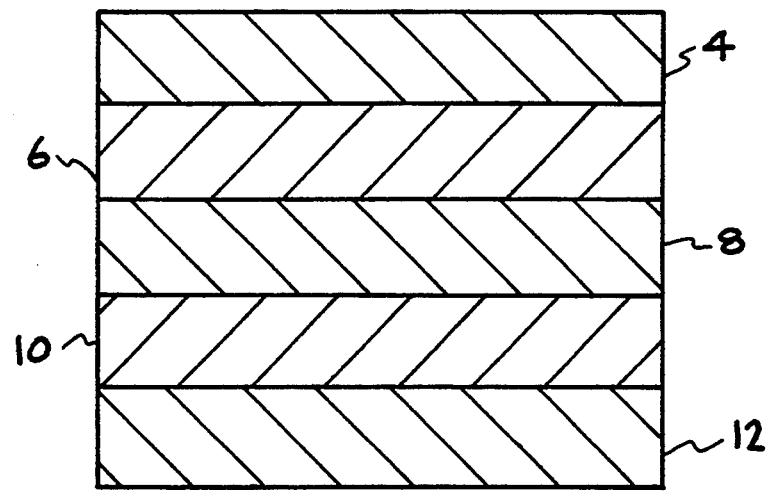
FIG. 1 is a vertical cross-sectional view of a stack of component layers, before compression and bonding, comprising alternate layers of material having substantially different flow stresses.
Figure 2:
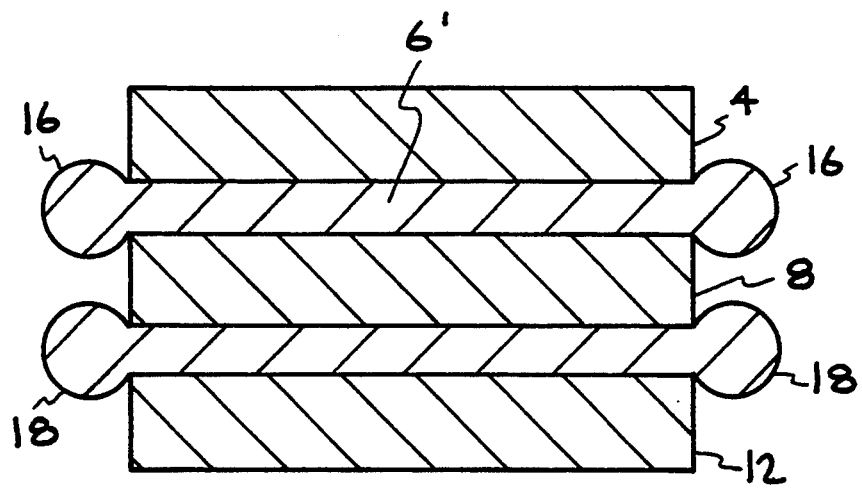
FIG. 2 is a vertical cross-sectional view of the stack of component layers of FIG. 1, after compression bonding in accordance with the prior art, showing the extrusion of the low flow stress component from the stack.

The low flow stress material may be defined as a material having flow stresses so low that an iso-strain deformation condition during the bonding process is not satisfied, causing the low flow stress material to deform prematurely and extrude out of the stack, as shown in FIG. 2, unless restrained in accordance with the invention. The low flow stress material may also be defined with respect to the high flow stress material with which it is laminated. Thus, a material which may be deemed to be a low flow stress material when laminated with a much harder material, may be deemed to be a high flow stress material when laminated with a much softer material. For example, an Aluminum Association alloy AA 5182, when laminated with Aluminum Association alloy AA 6090 containing 25 Volume % participated silicon carbide (SiCp), may be termed a low flow stress material. However, when the same aluminum alloy (AA 5182) is laminated with a softer material such as magnesium-lithium (Mg—Li) alloy containing 9 wt. % lithium, the AA 5182 alloy may be deemed to be the high flow stress material.

Therefore, the term "low flow stress material" may be further defined as a material having a flow stress of at least 10% less than the high flow stress material with which it is laminated. The term "high flow stress material" may be similarly defined as a material having a flow stress at least 10% greater than the low flow stress material with which it is laminated. However, the difference between the flow stresses may be much greater, e.g., by an order of magnitude or higher if desired.

Suitable materials which may be used in the respective formation of the high flow stress layers and low flow stress layers include various metals, ceramics, alloys and composites. Both ferrous and nonferrous alloys may be used as the component layers in the invention. By way of illustration, and not of limitation, materials which may be used in forming either the low flow stress layers or the high flow stress layers include silicon carbide and boron nitride; metals such as copper, nickel, magnesium, molybdenum, aluminum, and titanium; metal alloys such as brass, steel, aluminum alloys, and ultrahigh carbon steel; and composites such as magnesium-, aluminum-, and titanium-based metal matrix composites that contain carbide, nitride, oxide, carbonitride, carbo-oxy-nitride, and other similar materials.

The metal laminate composites of the invention may vary in thickness, as may the individual layers in the laminated metal composite. That is, the individual layers comprising the laminated metal composite of the invention need not have the same thickness. However, as noted above, the individual flow constraining element for each low flow stress layer must have a thickness matching the thickness of the particular layer of low flow stress material which it surrounds.

The invention may be applied to the fabrication of any number of alternating layers of low flow stress materials and high flow stress materials. Furthermore, not all of the low flow stress layers in the stack need to be the same as one another in either thickness or identity of material; nor do all of the high flow stress layers need to be the same. The invention may also be applied to fabrication of multi-layer multi-component metal laminates in which one or more of the low flow stress component layers are in the liquid state at the bonding temperature. As long as the liquid components are contained tightly within the respective flow constraining element and the adjoining layers of high flow stress material (or sacrificial layers as will be discussed below) the premature flow and leak age of the liquid material can be prevented.

Press or roll bonding of such a liquid phase can be used to form a "smart laminate" in which sensors are embedded during the manufacturing stage of the laminate. The sensors can monitor the condition of a particular material. The proper selection of the component and sensor materials is important to avoid unwanted degradation or loss of the sensor materials through chemical reaction with the component layers or plastic deformation during the deformation bonding process.

Laminates containing flow constraining elements in accordance with the invention, may be prepared, in a preferred embodiment, by cutting an opening in a sheet of material having a flow stress approximately the same as the high flow stress layers to be used in the stack. A material having a low flow stress, and having a thickness approximately that of the flow constraining element, is then cut to fit the opening in the flow constraining element and the low flow stress material is then placed in the opening. In a preferred embodiment, the opening in the flow constraining element will be circular, thus forming a ring around the low flow stress material. A layer of high flow stress material is then placed beneath and over the low flow stress material and surrounding flow constraining element. The layers are then alternated to form the desired stack of any number of layers desired for the particular application.

Formation of the laminated metal composite of the invention is not complete, however, until the layers within the stack are firmly bonded to one another. Bonding may be achieved by deforming the stack of layers. However, friction between the platens or rolls and the surface of the outer layers during deformation, can reduce the flow of the outer layers more than the flow of the interior layers. Then the interior layers could bulge and the overall laminate could then assume the appearance of a barrel. The bulging can be more prominent as the stack height increases. Consequently some form of frictional abatement is desirable at the contact surfaces of the platens and outer layers to reduce the bulging effect.

The effects of friction may be abated by lubricating the top and bottom layers of the stack, e.g., with an appropriate lubricant. Such a lubricating procedure will reduce the residual friction produced at the outer layers of the stack when contacted by machinery such as the platens of a press. Suitable lubricants may include graphite, boron nitride, or any other similar type of lubricating material.

Alternatively, one or more sacrificial layers may be placed over and beneath the other layers of the stack to allow the layers of the stack intermediate of such sacrificial layers to flow more uniformly. The term "sacrificial layer" is thus intended to define a protective material for minimizing the frictional impact which would otherwise result from directly contacting the upper and lower surfaces of the stack with deformation equipment, e.g., the platens in a press, or the rolls in a rolling mill. The technique of adding sacrificial layers to the top and/or bottom of the stack can be applied to the previously described concept of forming laminates with one component melting at the bonding temperature. One or more types of materials may be used to form the sacrificial layers.

Thus, as illustrated in FIG. 3, layers $28a$, $30a$, $28b$, $30b$, and $28c$ on top of stack 20; and layers $28d$, $30c$, $28e$, $30d$, and $28f$ beneath stack 20 are deemed to be sacrificial layers whose deformation during the rolling operation to bond the layers of the stack together will not effect the central layers of the stack, and such layers may be later removed, e.g., by milling of the laminate after the bonding operation, to remove layers $28a$–$28f$ and layers $30a$–$30d$.

Suitable materials which may be used as the sacrificial layer(s) include the same low flow stress material used in the stack and/or a third material which may have a flow stress which differs from either the low flow stress material or the high flow stress material used in forming the layers of the stack. For example, the sacrificial layer material may be a metal, a metal alloy, or a metal matrix composite (MMC). When more than one sacrificial layer is desired on either or both ends of the stack (as illustrated in FIG. 3), layers of a metal or metal alloy alternating with one or more MMC layers may be used. Preferred alternating layers are selected from either alternating two different aluminum alloys or alternating an aluminum alloy and an MMC. The lubricant discussed above may be used in conjunction with the sacrificial layers to produce the laminated metal composites of the invention. An example of where the same low flow stress material cannot be used as the sacrificial layer, however, is where bonding is performed at a temperature exceeding the melting point of the low flow stress component, necessitating the use of a different material.

Various processing conditions may be used to deform the stack, including hot pressing, hot or cold rolling, or a combination thereof. For example, the stack of FIG. 3 can be placed in a hot press or a rolling mill and then substantially deformed. Preferably the stack is deformed to from about $\frac{1}{3}$ to about $\frac{1}{4}$ of its original height at a suitable elevated temperature appropriate to the particular materials present in the stack. Normally the stack may be heated to just below the lowest melting point of its component layers. Alternatively, the stack may be heated to a temperature well below this temperature but which has, for example, been previously determined empirically to be sufficient to bond together the layers of the stack.

Figure 4:
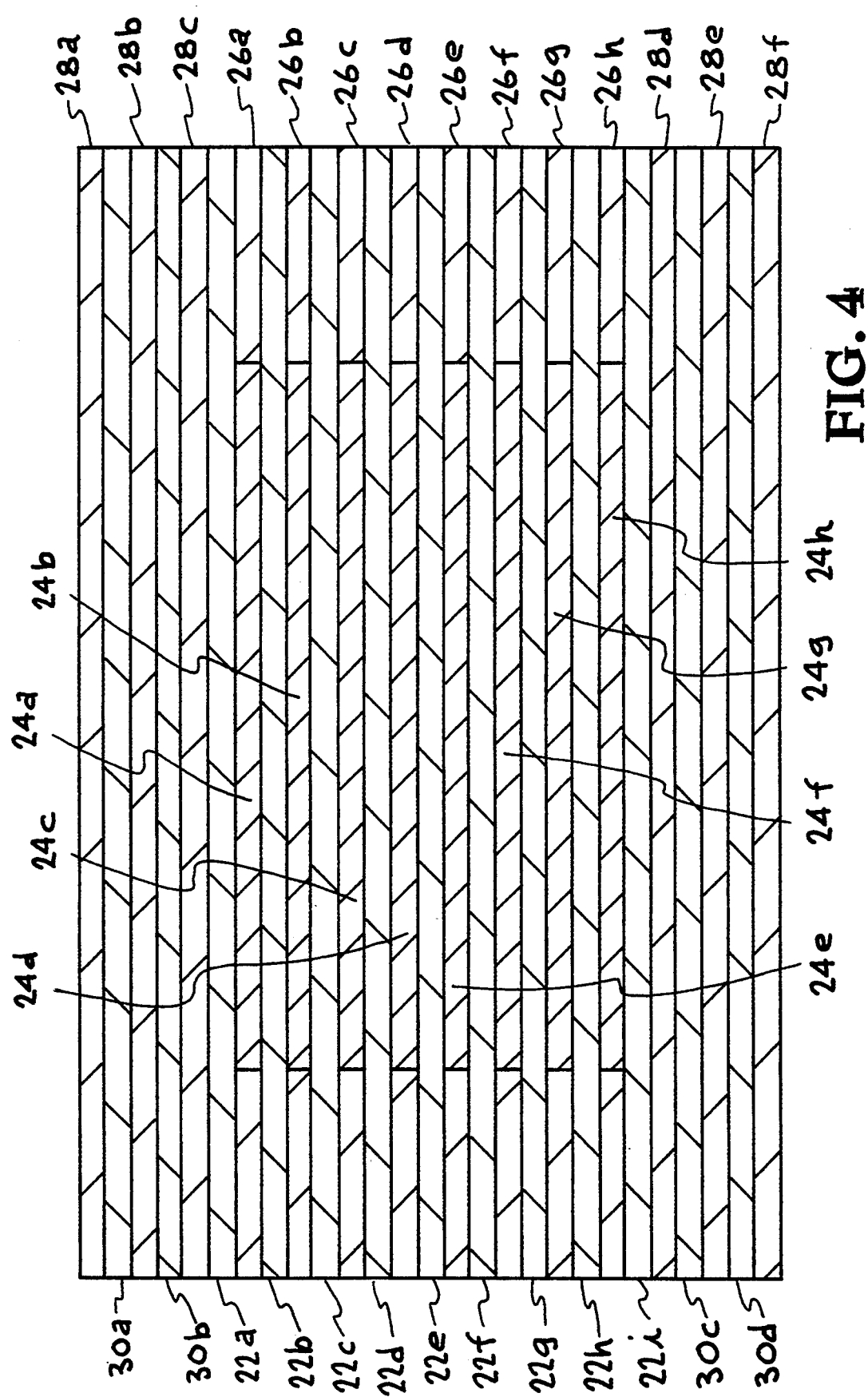
FIG. 4 is a vertical cross-sectional view of the stack of FIG. 3 after the stack has been compressed to bond the layers together to form the laminated metal composite of the invention.

The deformation promotes bonding between the layers to form a laminated metal composite, a cross section of which is illustrated in FIG. 4. As will be noted from a comparison of FIG. 3 (representing stack 20 prior to deformation) with FIG. 4, the deformation resulting not only in a bonding of the layers together, but also, in view of the use of the flow constraining elements of the invention, a uniform deformation; with the height of the stack thereby reduced and the width of the stack increased. After deformation the sacrificial layers may be removed, if desired, by a suitable machining process. The edges of the laminate may also be trimmed to remove excess material including, if desired, the flow constraining material.

After deformation processing, the laminated metal composites may be subjected to a heat treatment, for example, a T6 annealing as is well known in the aluminum industry, in order to selectively modify the mechanical properties of certain component layers, if necessary. Post-lamination T6 heat treatment of a laminated metal composite comprising alternate layers of low flow stress aluminum alloy AA 5182 and high flow stress AA 6090 aluminum alloy containing 25 Vol. % particulate silicon carbide was found to increase the tensile yield and flow stress of the laminated metal composites formed in accordance with the invention.

To further illustrate the invention, a laminated metal composite was made by first cutting a disk out of a sheet of AA 5182 aluminum alloy. A disk of the same diameter was also cut out of a sheet of a magnesium (Mg) alloy containing 9 wt. % lithium (Li) and having the same thickness as the sheet of AA 5182. The Mg/Li alloy disk was then placed in the circular opening remaining in the AA 5182 sheet to thereby permit the AA 5182 alloy to function as a flow constraining ring for the Mg/Li alloy disk which represents the low flow stress material of the stack. A sheet of AA 6061 aluminum alloy containing 25 vol. % particulate silicon carbide (SiCp) was then placed on the AA 5182 sheet and the Mg/Li disk, representing the high flow stress material of the stack. Then, another layer of Mg/Li alloy encased in a sheet of AA 5182 aluminum alloy was placed on the layer of AA 6061 SiCp. The high flow stress layers and the ring-encased low flow stress layers were alternated to form a stack of 21 layers. Thereafter, alternating layers of the AA 6061 SiCp high flow stress material and layers of AA 5182 were added to the top and bottom of the stack, as illustrated, respectively, by layers 28a–28f and 30a–30d in FIG. 3. The resulting stack was deformed to form the desired laminate by rolling in a rolling mill while maintaining the temperature of the stack at about 450° C. The flow stress of the Mg—Li alloy is much lower at this press bonding temperature than that of the high flow stress material (AA 6061 SiCp) in the stack or AA 5182, while the two aluminum alloys have comparable flow stresses at the bonding temperature.

Various techniques were employed to characterize the properties of the resulting multi-layer laminated metal composites formed in accordance with the invention. In particular, tensile properties, fracture toughness, and damping capacity of the composites were measured and found to exceed those of the individual materials when formed to the same dimensions.

Thus, the invention provides a laminated metal composite and a method of making same, wherein individual layers of low flow stress materials are alternated with layers of high flow stress materials, with the layers of low flow stress material individually restrained during subsequent deformation bonding by individual layers of flow constraining material respectively formed around each layer of low flow stress material. While a specific embodiment of the laminated metal composite of the invention and method of making same has been illustrated and described, in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A laminated metal composite comprising alternate layers of low flow stress material and high flow stress material wherein the edges of each layer of low flow stress material is individually surrounded with a flow constraining element having the same thickness as the layer of low flow stress material that it surrounds.

2. The laminated metal composite of claim 1 wherein said flow constraining element comprises a single continuous flow constraining element surrounding all of the edges of said low flow stress layer.

3. The laminated metal composite of claim 2 wherein said flow constraining element comprises a layer having an opening therein having an inner dimension approximately equal to the outer dimension of said low flow stress layer.

4. The laminated metal composite of claim 2 wherein said low flow stress layer is circular with a single continuous edge and said flow constraining element comprises a layer having a circular opening therein having an inner diameter approximately equal to the outer diameter of said circular low flow stress layer.

5. The laminated metal composite of claim 2 wherein said low flow stress layer is circular with a single continuous edge and said flow constraining element comprises a circular ring having an inner diameter approximately equal to the outer diameter of said circular low flow stress layer.

6. The laminated metal composite of claim 1 wherein said flow constraining element comprises a material having a flow stress approximately equal to that of said high flow stress material in said layers in said composite.

7. The laminated metal composite of claim 1 wherein said flow constraining element comprises the same material as said high flow stress material in said layers in said composite.

8. The laminated metal composite of claim 1 wherein one or more sacrificial layers are provided in said laminate above and beneath said stack of alternate layers of low flow stress material and high flow stress material wherein said sacrificial layers comprise one or more materials having a flow stress approximately equal to the flow stress of said low flow stress layers in said composite adjacent said high flow stress layers.

9. The laminated metal composite of claim 8 wherein a plurality of said sacrificial layers are provided in said laminate above and beneath said stack of alternate layers of low flow stress material and high flow stress material.

10. The laminated metal composite of claim 8 wherein said one or more sacrificial layers provided in said laminate above and beneath said stack of alternate layers of low flow stress material and high flow stress material comprise the same material as said material in said low flow stress layers in said stack.

11. The laminated metal composite of claim 8 wherein at least one of said sacrificial layers and high flow stress material comprises a different material from said material in said low flow stress layers in said stack.

12. A laminated metal composite comprising alternate layers of low flow stress material and high flow stress material wherein said low flow stress material has a circular perimeter and said circular perimeter of each layer of low flow stress material is individually surrounded by a flow constraining ring having an inner diameter approximately equal to said circular perimeter of said low flow stress layer.

13. The laminated metal composite of claim 12 wherein said flow constraining ring is formed of the same material as said high flow material in said layers in said composite.

14. A process for forming a laminated metal composite which comprises the steps of:
   a) forming a stack of alternate layers of low flow stress material and high flow stress material; and
   b) individually surrounding the edges of each layer of low flow stress material with a flow constraining element having the same thickness as the layer of low flow stress that it surrounds.

15. The process of claim 14, wherein step b) further comprises surrounding all of the edges of said low flow stress layer with a single continuous flow constraining element.

16. The process of claim 14, wherein step a) further comprises providing low flow stress layers of circular cross-section and then individually surrounding each of said circular low flow stress layers with a flow constraining ring having an inner diameter approximately equal to the outer diameter of said circular low flow stress layer.

17. The process of claim 14, wherein step b) further comprises surrounding said low flow stress layer with a continuous flow constraining element having a flow stress approximately equal to that of said high flow stress material in said layers in said composite.

18. The process of claim 14 including the further step of forming one or more sacrificial layers on top of and beneath said stack of low flow stress layers and high flow stress layers.

19. The process of claim 14 including the further step of bonding said layers of low flow stress and high flow stress together.

20. The process of claim 19 wherein said step of bonding said layers of low flow stress and high flow stress together further comprises applying pressure to said stack to bond said layers together.

21. The process of claim 20 wherein said step of bonding said layers of low flow stress and high flow stress together by applying pressure to said stack further comprises passing said stack through a pair of rollers to pressure bond said layers together.

22. The process of claim 20 wherein said step of bonding said layers of low flow stress and high flow stress together by applying pressure to said stack further comprises heating said stack to a temperature below the melting point of the lowest melting point material in said stack.

* * * * *